US009002359B1

(12) United States Patent
Vargantwar et al.

(10) Patent No.: US 9,002,359 B1
(45) Date of Patent: Apr. 7, 2015

(54) METHOD AND SYSTEM FOR INTELLIGENT DETERMINATION OF PSEUDONOISE (PN) OFFSETS (75) Inventors: Sachin R. Vargantwar, Macon, GA (US); Maneesh Gauba, Overland Park, KS (US); Maulik K. Shah, Overland Park, KS (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 463 days.

(21) Appl. No.: 13/445,280

(22) Filed: Apr. 12, 2012

(51) Int. Cl.
H04W 36/00 (2009.01)

(52) U.S. Cl.
CPC ................... *H04W 36/0044* (2013.01)

(58) Field of Classification Search
None
See application file for complete search history.

(56) References Cited

U.S. PATENT DOCUMENTS

| 5,577,022 | A | 11/1996 | Padovani et al. | |
|---|---|---|---|---|
| 6,188,354 | B1 | 2/2001 | Soliman et al. | |
| 6,204,812 | B1 | 3/2001 | Fattouche | |
| 6,321,090 | B1 | 11/2001 | Soliman | |
| 6,542,743 | B1 | 4/2003 | Soliman | |
| 6,549,545 | B1 | 4/2003 | Yamamoto et al. | |
| 6,553,230 | B1 * | 4/2003 | Plestid et al. | 455/436 |
| 6,564,057 | B1 | 5/2003 | Chun et al. | |
| 6,580,749 | B1 | 6/2003 | Miura | |
| 6,775,252 | B1 | 8/2004 | Bayley | |
| 7,020,180 | B2 | 3/2006 | Challa et al. | |
| 7,236,796 | B2 | 6/2007 | Soliman | |
| 7,391,759 | B2 | 6/2008 | Wallace et al. | |
| 7,420,947 | B2 | 9/2008 | Sendonaris et al. | |
| 7,983,622 | B1 * | 7/2011 | Vaughan | 455/67.16 |
| 8,055,273 | B1 | 11/2011 | Rai et al. | |
| 2001/0006514 | A1 | 7/2001 | Park | |
| 2002/0065089 | A1 | 5/2002 | Soliman | |
| 2003/0114172 | A1 | 6/2003 | Soliman | |
| 2003/0214436 | A1 | 11/2003 | Voor et al. | |

(Continued)

FOREIGN PATENT DOCUMENTS

EP 1107483 A1 6/2001

OTHER PUBLICATIONS

Chuck Wheatley, "Self-synchronizing a CDMA cellular network", Wireless Technologies China '99, Conference Proceedings, pp. 37-44 (1999).

(Continued)

*Primary Examiner* — Vladimir Magloire
*Assistant Examiner* — Frank Donado (57) ABSTRACT

A mobile station measures a pseudonoise (PN) offset and a signal strength of a spread spectrum signal transmitted by a given sector of a spread spectrum communication system. The measured PN offset differs from a nominal PN offset of the given sector. The mobile station transmits a measurement message that includes the measured PN offset and the measured signal strength. The spread spectrum communication system receives the measurement message and determines a location associated with the mobile station (e.g., based on location coordinates included in the measurement message). The spread spectrum communication system determines the nominal PN offset of the given sector based on the measured PN offset and the location associated with the mobile station. If the given sector is a valid handoff destination, the spread spectrum communication system transmits to the mobile station a handoff instruction that identifies the given sector by the measured PN offset.

13 Claims, 5 Drawing Sheets

(56) References Cited

U.S. PATENT DOCUMENTS

2004/0131032 A1    7/2004   Sendonaris et al.
2004/0203864 A1*   10/2004   DiBuduo .................. 455/456.1
2004/0233874 A1    11/2004   Baker
2005/0020264 A1    1/2005   Akao et al.
2008/0160998 A1*   7/2008   Jovanovic .................... 455/436
2009/0125630 A1    5/2009   Gogic
2010/0311420 A1    12/2010   Reza et al.

OTHER PUBLICATIONS

"Method and System for Defining Search Windows Based on Mobile Station Location," U.S. Appl. No. 12/019,374, filed Jan. 24, 2008.

* cited by examiner

METHOD AND SYSTEM FOR INTELLIGENT DETERMINATION OF PSEUDONOISE (PN) OFFSETS

BACKGROUND

Spread spectrum communications are commonly used in cellular networks that provide wireless service to mobile stations, such as wireless telephones. Such cellular networks may operate, for example, in accordance with IS-95 CDMA or cdma2000 standards.

The signals transmitted by base transceiver stations (BTSs) in a spread spectrum communication system are spread by a pseudonoise (PN) sequence. For example, in accordance with IS-95 CDMA standards, the pilot signal transmitted by a BTS is spread by a "short" PN sequence at a chipping rate of 1.2288 MHz, and the "short" PN sequence repeats itself every 26.67 milliseconds. With this chipping rate, one "chip" is approximately 0.8138 microseconds.

Each pilot signal transmitted by a spread spectrum communication system may be spread by the same short PN sequence but with a different phase or "PN offset." In this regard, the beginning of a PN sequence used to spread a signal may occur at a particular time offset relative to a reference time (such as the beginning of every even second), according to the system time that is used by the spread spectrum communication system. The "PN offset" of the signal may then correspond to this particular time offset.

In accordance with IS-95 CDMA standards, each PN offset is defined by an index that is an integer in the range of 0 through 511. The actual PN offset is then found by multiplying its index by 64 chips. Thus, a PN offset of "0" means that the PN sequence begins at the reference time. A PN offset of "1" means that the PN sequence begins 64 chips after the reference time. A PN offset of "2" means that the PN sequence begins 128 chips after the reference time, etc. In this way, different pilot signals may be distinguished by their PN offsets.

As noted above, the PN offset of a pilot signal is defined with respect to a reference time according to the system's time. However, when the pilot signal is received by a mobile station, the mobile station may measure a different PN offset. The difference between the PN offset transmitted by a BTS (the nominal PN offset) and the PN offset measured by the mobile station (the measured PN offset) can arise for at least two reasons: (1) there may be a propagation delay between when the pilot signal is transmitted by the BTS and when it is received by the mobile station; and (2) the mobile station's time may not be perfectly synchronized to the system's time.

The propagation delay can be a function of the distance between the BTS and the mobile station. For example, a spread spectrum signal will travel approximately 244 meters in one chip (assuming that one chip is 0.8138 microseconds). Thus, it takes about 6.6 chips for a spread spectrum signal to travel one mile. This means that if the mobile station is trying to detect a pilot signal from a target BTS that is one mile away, the mobile station will measure a PN offset that is 6.6 chips greater than the nominal PN offset of the target BTS's pilot signal (provided that the mobile station's time is perfectly synchronized with the system's time).

However, the mobile station's time may not be perfectly synchronized with the system's time. Typically, the mobile station seeks to synchronize its time with the system's time based on system time information transmitted by a source BTS in the spread spectrum communication system. However, there is a propagation delay between when the source BTS transmits the system time information and when the mobile station receives it, due to the distance between the source BTS and the mobile station. The propagation delay associated with the system time information causes the mobile station's time to lag the system's time, thereby making the PN offsets of pilot signals received by the mobile station appear to be less than they would otherwise.

The net effect of the propagation delays will depend on how, $D_S$, the distance between the mobile station and the source BTS (the source of the system time information used by the mobile station), compares to $D_T$, the distance between the mobile station and the target BTS (the BTS that transmits the target pilot signal being sought by the mobile station). If $D_S$ is equal to $D_T$, then the measured PN offset of the target pilot signal may be equal to its nominal PN offset. If $D_S$ is less than $D_T$, then the measured PN offset of the target pilot signal may be greater than its nominal PN offset. If $D_S$ is greater than $D_T$, then the measured PN offset of the target pilot signal may be less than its nominal PN offset.

Because the PN offset of a pilot signal that is measured by a mobile station can be either greater than or less than the nominal PN offset of the pilot signal, a mobile station may use a search window centered on the nominal PN offset to search for the pilot signal. The search window typically has a width (in chips) that is specified by a width parameter that the mobile station receives from the spread spectrum communication system. In this way, the mobile station may find a target pilot signal so long as the target pilot signal's PN offset at the mobile station is within the range of PN offsets specified by the search window.

OVERVIEW

In a first principal aspect, an exemplary embodiment provides a method for a spread spectrum communication system. The spread spectrum communication system comprises a plurality of sectors in which each sector is associated with a respective nominal pseudonoise (PN) offset. The spread spectrum communication system receives a measurement message from a mobile station. The measurement message includes a measured PN offset that the mobile station measured for a given sector in the plurality of sectors and further includes a signal strength that the mobile station measured for the given sector. The measured PN offset differs from a nominal PN offset of the given sector. The spread spectrum communication system determines a location associated with the mobile station. The spread spectrum communication system determines the nominal PN offset of the given sector based on the measured PN offset and the location associated with the mobile station. The spread spectrum communication system determines whether the given sector is a valid handoff destination. In response to a determination that the given sector is a valid handoff destination, the spread spectrum communication system transmits to the mobile station a handoff instruction that identifies the given sector by the measured PN offset.

In a second principal aspect, an exemplary embodiment provides a spread spectrum communication system that comprises a plurality of BTSs and a controller for controlling the BTSs. The BTSs are configured to provide wireless coverage in a plurality of sectors, wherein each sector is associated with a respective nominal PN offset. The controller is configured to: (a) receive a measurement message from a mobile station, wherein the measurement message includes a measured PN offset that the mobile station measured for a given sector in the plurality of sectors and further includes a signal strength that the mobile station measured for the given sector, wherein the measured PN offset differs from a nominal PN offset of the given sector; (b) determine a location associated with the mobile station; (c) determine the nominal PN offset of the given sector based on the measured PN offset and the location associated with the mobile station; (d) determine whether the given sector is a valid handoff destination; and (e) in response to a determination that the given sector is a valid handoff destination, generate a handoff instruction for the mobile station, wherein the handoff instruction identifies the given sector by the measured PN offset.

In a third principal aspect, an exemplary embodiment provides a method for a mobile station. The mobile station receives, from a primary sector of a spread spectrum communication system, a neighbor list that identifies a plurality of neighbor sectors in the spread spectrum communication system, wherein each neighbor sector is identified in the neighbor list by a respective nominal PN offset. The mobile station measures a PN offset of a spread spectrum signal transmitted by a given sector in the plurality of neighbor sectors to obtain a measured PN offset, wherein the measured PN offset differs from a nominal PN offset that identified the given sector in the neighbor list. The mobile station measures a signal strength of the spread spectrum signal transmitted by the given sector to obtain a measured signal strength. The mobile station transmits a measurement message that includes the measured PN offset and the measured signal strength. The mobile station receives a handoff instruction that identifies the given sector by the measured PN offset.

DETAILED DESCRIPTION OF EXEMPLARY EMBODIMENTS

1. Introduction

The inventors have recognized that the propagation delay of a spread spectrum signal can be particularly problematic when a PN offset that has a nominal value when transmitted by a BTS appears to have a different value when the spread spectrum is received by a mobile station. For example, a PN 2 signal might appear to a mobile station that receives it to be a PN 3 signal, or even a PN 4 signal, due to propagation delay. The difference between the nominal PN offset of a spread spectrum signal and the apparent PN offset that is measured by a mobile station can result in PN confusion.

Figure 1A:
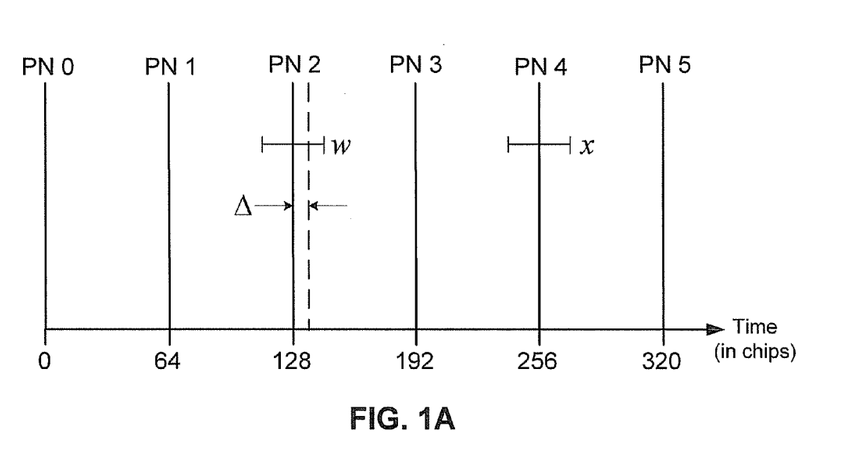
FIG. 1A illustrates nominal PN offsets and an apparent PN offset at a mobile station.
Figure 1B:
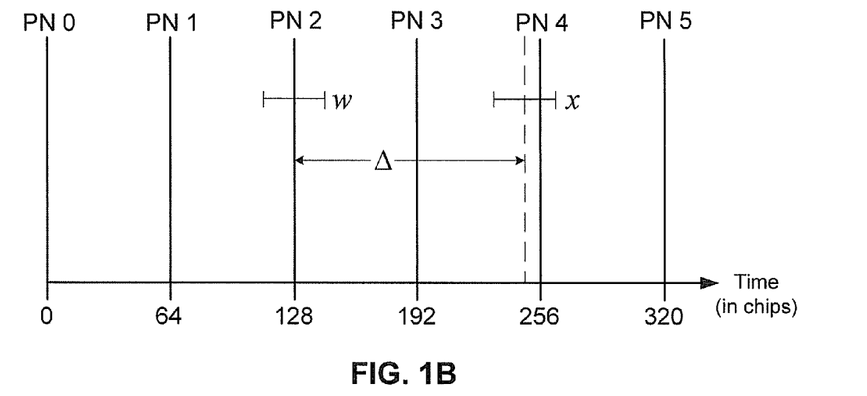
FIG. 1B illustrates nominal PN offsets and an apparent PN offset at a mobile station that may result in PN confusion, in accordance with an exemplary embodiment.

FIGS. 1A and 1B illustrate how propagation delay can lead to PN confusion. In FIGS. 1A and 1B, the solid vertical lines represent the phase in chips for nominal PN offsets PN 0 through PN 5. Also shown are two search windows, one having a width of w chips that is centered about the PN 2 line and another having a width of x chips that is centered about the PN 4 line. The w and x search windows may be used by a mobile station to scan for spread spectrum signals corresponding to PN 2 and PN 4, respectively. The dashed vertical lines in FIGS. 1A and 1B represent the apparent phase of the PN 2 signal at the mobile station.

In the example of FIG. 1A, the mobile station is relatively close to the BTS that transmits the PN 2 signal. Thus, the propagation delay is relatively small. In FIG. 1A, the difference between the nominal phase of the PN 2 signal (i.e., the phase when transmitted from the BTS) and the apparent phase of the PN 2 signal (i.e., the phase that is measured at the mobile station) is represented by $\Delta$. In the example shown in FIG. 1A, $\Delta < w/2$, so the PN 2 signal falls within the search window.

In the example of FIG. 1B, however, the mobile station is relatively far away from the BTS that transmits the PN 2 signal. As a result, the difference between the nominal phase of the PN 2 signal and the apparent phase of the PN 2 signal (represented by the $\Delta$ in FIG. 1B) is relatively large. As shown in FIG. 1B, the apparent phase of PN 2 signal is close to the phase of a nominal PN 4 signal. Since a distance of about 9.7 miles between a BTS and a mobile station results in a propagation delay of 64 chips, the scenario illustrated in FIG. 1B may occur when the mobile station is about 19 miles away from the BTS that transmits the PN 2 signal. As shown in FIG. 1B, the apparent phase of the PN 2 signal is well outside of the w search window that the mobile station uses to scan for PN 2 signals. However, the apparent phased of the PN 2 signal falls within the x search window that the mobile station uses to scan for PN 4 signals. Thus, the mobile station may regard the PN 2 signal as a PN 4 signal.

The difference between the nominal and measured PN offsets can have adverse consequences. For example, a mobile station may scan for pilot signals with different PN offsets in order to find sectors that may be suitable candidates for a handoff. If the mobile station finds a sufficiently strong pilot signal from a given sector, the mobile station may report the signal strength and the PN offset of the given sector to the spread spectrum communication system, e.g., by transmitting a Pilot Strength Measurement Message (PSMM). However, if the mobile station misidentifies the PN offset of the given sector due to PN confusion, the system may not recognize the sector as being a valid handoff destination. For example, the system may determine whether a sector is a valid handoff destination for a mobile station based on whether the sector is in a neighbor list for the mobile station. But if the system does not recognize the PN offset of a sector that a mobile station reports in a PSMM, because the mobile station reports a measured PN offset for the sector that is different than its nominal PN offset, then the system may not allow a handoff to that sector—even though the sector may be a neighbor sector that would otherwise be considered a valid handoff destination. Such failures to recognize valid handoff destinations can increase the likelihood of dropped calls.

To address such problems, the inventors propose having the spread spectrum communication system intelligently determine what nominal PN offset corresponds to a measured PN offset that is reported by a mobile station. For example, when the system receives a message from a mobile station (such as a PSMM) that includes a PN offset that the mobile station has measured for a given sector, the system may determine a location associated with the mobile station and then determine the nominal PN offset based on the measured PN offset and the location associated with the mobile station. Once the system has determined the nominal PN offset, the system can identify the given sector that corresponds to that nominal PN offset and determine whether the given sector is a valid handoff destination. If so, the system may transmit a handoff instruction, such as a Handoff Direction Message (HDM), to the mobile station. The handoff instruction may identify the given sector by the measured PN offset, i.e., the PN offset that the mobile station measured and reported to the system.

The spread spectrum communication system may determine a location associated with the mobile station in various ways. In one approach, the mobile station may transmit its location coordinates to the system. For example, the mobile station may include its location coordinates in the message that reports the PN offset(s) that the mobile station measured. The mobile station may determine its location coordinates using the Global Positioning System (GPS), using terrestrial-based signals, or in some other manner. Alternatively, the system may determine the location associated with the mobile station based on round-trip delay (RTD) measurements, based on the primary sector that is serving the mobile station, or in some other manner.

Once the system has determined a location associated with the mobile station, the system may determine what nominal PN offset would appear to be the measured PN offset at the mobile station, based on the location associated with the mobile station and a location associated with the nominal PN offset (e.g., the location of a BTS that transmits spread spectrum signals with that nominal PN offset). For example, the system may calculate a distance, D, between a location associated with a particular nominal PN offset and the location associated with the mobile station and determine whether that distance at least partially accounts for the phase difference, $\Delta$, between that particular nominal PN offset and the measured PN offset reported by the mobile station. In other words, the system may determine whether $D/c \approx \Delta$ for a particular nominal PN offset, where c=the speed of light. If so, then the system may consider that particular nominal PN offset as corresponding to the measured PN offset reported by the mobile station. In this way, the system may intelligently determine what nominal PN offset and, thus, what sector in the spread spectrum communication system, corresponds to a measured PN offset that is reported by the mobile station.

2. Exemplary Spread Spectrum Communication System

Figure 2:
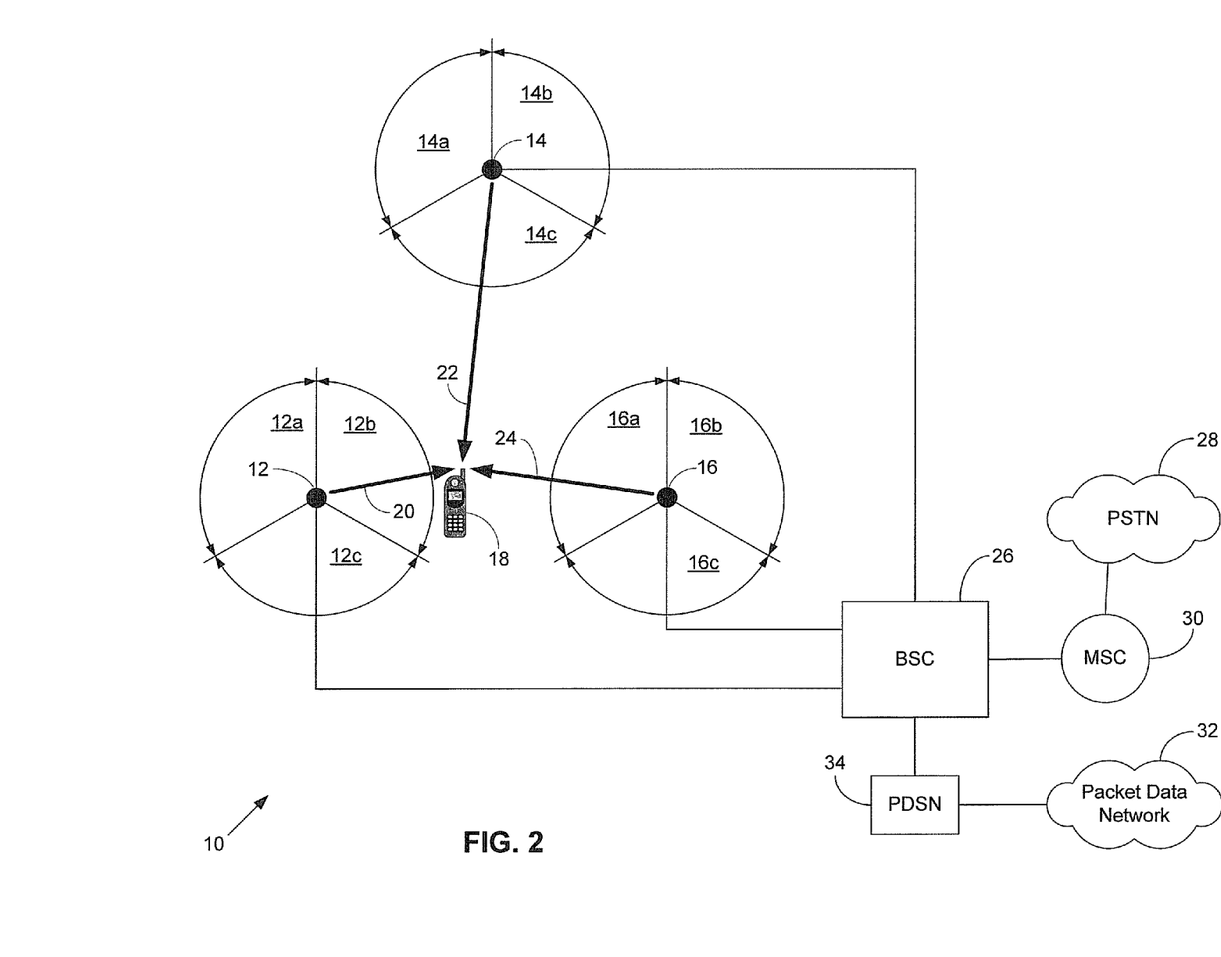
FIG. 2 is a block diagram of a spread spectrum communication system, in accordance with an exemplary embodiment.

FIG. 2 illustrates an exemplary spread spectrum communication system 10 in which exemplary embodiments may be employed. System 10 includes a plurality of base transceiver stations (BTSs), exemplified in FIG. 2 by BTSs 12, 14, and 16. Each BTS may be able to wirelessly communicate with mobile stations, such as mobile station 18. Mobile station 18 could be a wireless telephone, wireless personal digital assistant, wireless e-mail device, wirelessly-equipped laptop computer, or other wireless communication device.

Each BTS may include a plurality of transmitters and a plurality of receivers (the transmitters and receivers may be integrated into transceivers) for wireless communication with mobile stations, such as mobile station 18. Moreover, each BTS may include directional antennas to define a plurality of sectors. For example, BTS 12 may define sectors 12a, 12b, and 12c, BTS 14 may define sectors 14a, 14b, and 14c, and BTS 16 may define sectors 16a, 16b, and 16c. Although FIG. 2 shows each BTS with three sectors, it is to be understood that a BTS may have a greater or fewer number of sectors. Moreover, it is to be understood that the illustration of sectors in FIG. 2 is schematic only and that FIG. 2 is not intended to illustrate the precise geographic area covered by any sector.

The wireless communication between a mobile station and a sector may occur via one or more forward link channels (for communications from a transmitter in the sector to the mobile station) and one or more reverse link channels (for communications from the mobile station to a receiver in the sector). In the case of IS-95 CDMA, the forward link channels may include a pilot channel, a sync channel, a paging channel, and forward traffic channels, and the reverse link channels may include access channels and reverse traffic channels.

The signals in the forward link channels of a sector may each have a PN offset that is specific for that sector. That way, the mobile station can identify signals from different sectors based on PN offset. For example, BTS 12 may transmit forward link signals 20 in sector 12b, BTS 14 may transmit forward link signals 22 in sector 14c, and BTS 16 may transmit forward link signals 24 in sector 16a. Mobile station 18 may distinguish between forward link signals 20-24 based on their PN offsets.

In one example, forward link signals 20-24 are each spread by the same "short" pseudonoise (PN) sequence, but the beginning of the PN sequence occurs at a different time offset. The time offset between the beginning of the PN sequence and a reference time, according to the "system time" used by system 10, defines the nominal phase of each pilot signal. The nominal phase may be identified as a PN offset index ranging from 0-511. In particular, the PN offset index may be used to determine the nominal phase by multiplying the PN offset index by 64 chips. However, the phases of forward link signals 20-24 at mobile station 18 will differ from their nominal phases due to their respective propagation delays.

The propagation delay for a signal transmitted by a BTS is the time it takes the signal to propagate from the BTS to the mobile station. Thus, forward link signals 20 may be received with a propagation delay associated with the distance between BTS 12 and mobile station 18, forward link signals 22 may be received with a propagation delay associated with the distance between BTS 14 and mobile station 18, and forward link signals 24 may be received with a propagation delay associated the distance between BTS 16 and mobile station 18.

Mobile station 18 may use forward link signals from one or more of sectors 12b, 14c, and 16a, depending on the signal strengths of the pilot signals received by mobile station 18. For example, the pilot signal in forward link signals 20 transmitted by BTS 12 in sector 12b may be the strongest pilot signal received by mobile station 18. In that case, mobile station 18 may lock onto the pilot signal in forward link signals 20 and then receive system time information that is transmitted in a sync channel signal in forward link signals 20. Mobile station 18 may use the system time information to develop a time reference for mobile station 18.

Mobile station 18 may also receive a neighbor list transmitted by BTS 12, for example, over a paging channel in forward link signals 20. The neighbor list may identify the PN offsets of neighboring sectors, such as sector 14c of BTS 14 and sector 16a of BTS 16. Mobile station 18 may search for pilot signals having the PN offsets identified in the neighbor list and/or other pilot signals. If the mobile station 18 finds a sector's pilot signal that has sufficient received signal strength, then mobile station 18 may report the apparent PN offset of the pilot signal to the system 10 as a handoff candidate (e.g., in a PSMM). If system 10 approves the handoff, then the sector may be used by mobile station 18 for a soft handoff.

For example, if mobile station 18 is involved in a call via sector 12b, mobile station 18 may find that a pilot signal from sector 14c has sufficient signal strength and report its apparent PN offset to system 10. Sector 14c may then be added to an "active set" that is maintained for the mobile station 18 so as to achieve a soft handoff for the call. Because of this soft handoff, mobile station 18 may use forward traffic channels of both sector 12b and sector 14c for the call, and both of sectors 12b and sector 14c may receive reverse link signals from mobile station 18 for the call. Further, if mobile station 18 moves out of the wireless coverage area of sector 12b, then the call may be continued via sector 14c. Thus, being in a soft handoff for a call can advantageously reduce the chances of the call being dropped.

However, if BTS 14 is relatively far away from mobile station 18, then mobile station 18 may misidentify the PN offset of sector 14c because of PN confusion resulting from propagation delay. As a result, system 10 might not approve a handoff to sector 14c, even though it is a valid handoff destination. To overcome this problem, system 10 may be able to intelligently determine the nominal PN offset of sector 14c, even though mobile station may report a different PN offset of sector 14c due to PN confusion.

BTSs 12, 14, and 16 may be controlled by a base station controller (BSC) 26. For example, BSC 26 may control the use of forward and reverse traffic channels for wireless communication between BTSs 12, 14, and 16 and mobile stations, such as mobile station 18. BSC 26 may also control handoffs between the sectors in its service area (i.e., sectors 12a-c, 14a-c, and 16a-c).

BSC 26 may be communicatively coupled to a circuit-switched network, such as public switched telephone network 28, e.g., via a mobile switching center 30. BSC 26 may also be communicatively coupled to a packet-switched network, such as packet data network 32, e.g., via a packet data serving node (PDSN) 34. Mobile stations, such as mobile station 18, may engage in communication sessions with various endpoints via PSTN 28 or packet data network 32, in order to exchange voice, data, or other media. For example, a mobile station may engage in a voice call with an endpoint via PSTN 28. Alternatively, a mobile station may engage in a data session with an endpoint via packet data network 32, e.g., for voice-over-packet (VoP) communication, to send or receive e-mail, to browse the World Wide Web, to receive streaming video and/or audio, to participate in Internet gaming, or for other purposes.

3. Exemplary Operation

Figure 3:
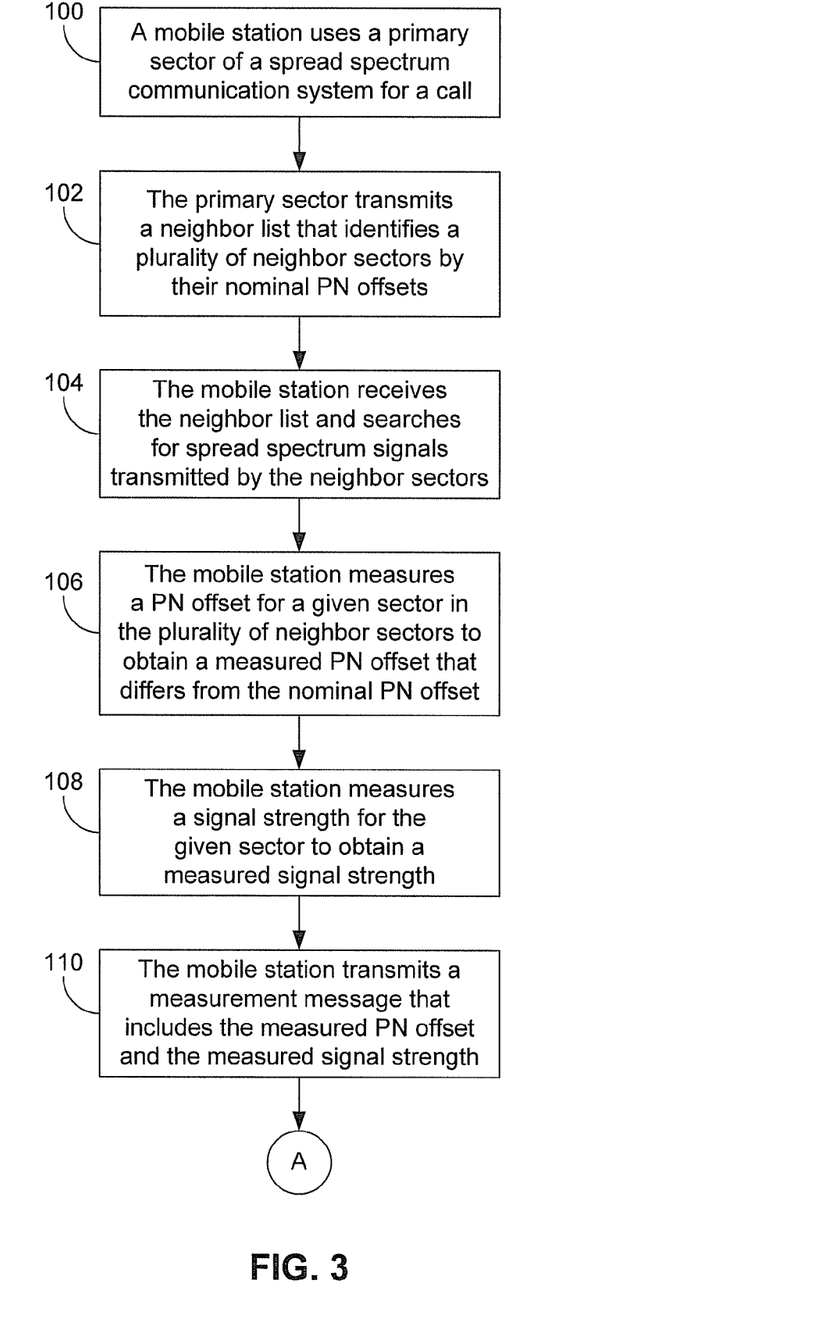
FIG. 3 is a flow chart illustrating a first part of a method, in accordance with an exemplary embodiment.
Figure 4:
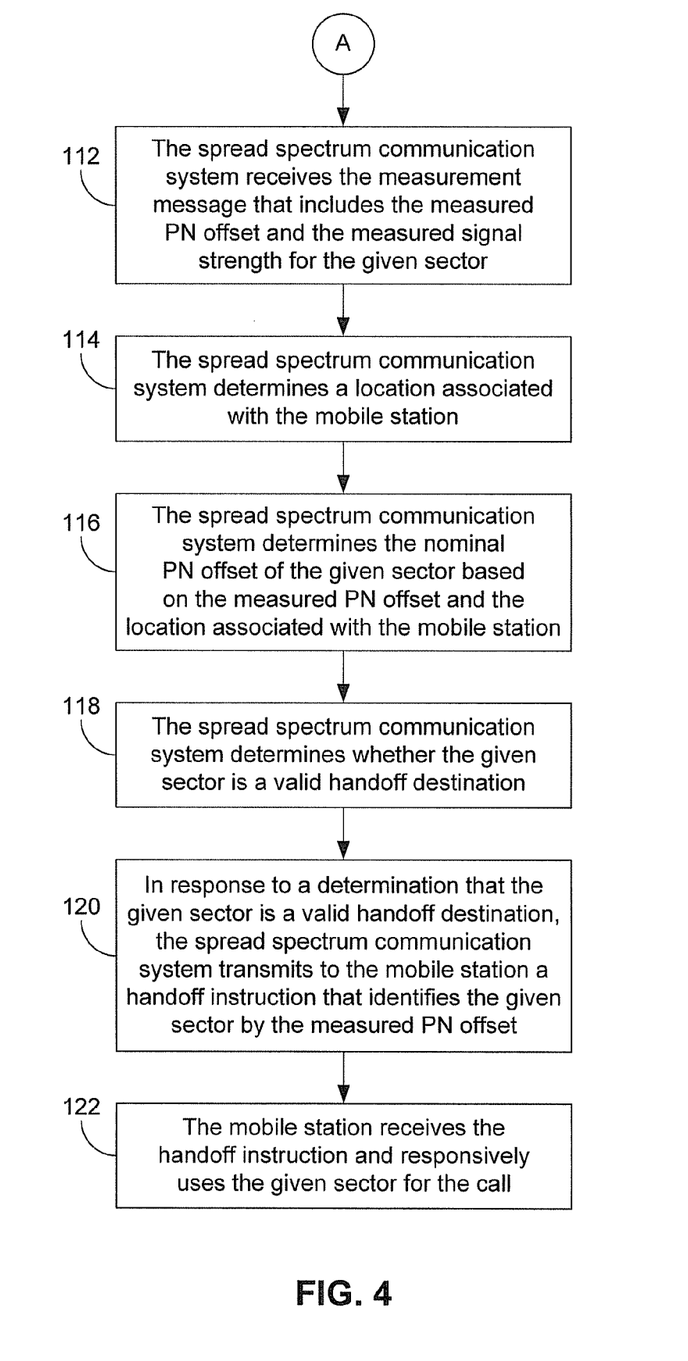
FIG. 4 is a flow chart illustrating a second part of the method of FIG. 3, in accordance with an exemplary embodiment.

FIGS. 3 and 4 are flow charts illustrating an exemplary method for a mobile station in communication with a spread spectrum communication system. For purposes of illustration, the method of FIGS. 3 and 4 will be discussed with reference to spread spectrum communication system 10 shown in FIG. 2. It is to be understood, however, that other configurations could be used.

The method may begin when a mobile station (e.g., mobile station 18) uses a primary sector of a spread spectrum communication system (e.g., sector 12b of system 10) for a call, as indicated by block 100. The call could be, for example, a voice call with one or more endpoints connected to PSTN 28 or a data session with one or more endpoints connected to packet data network 32. In using the primary sector for the call, the mobile station may receive media for the call over a forward traffic channel of the primary sector and may transmit media for the call over a reverse traffic channel of the primary sector. The mobile station may also be involved in a soft handoff for the call, i.e., using one or more other sectors. For example, in the configuration shown in FIG. 2, mobile station 18 might use both sector 12b and sector 16a for the call.

The primary sector transmits a neighbor list that identifies a plurality of neighbor sectors by their nominal PN offsets, as indicated by 102. The mobile station receives the neighbor list and searches for spread spectrum signals transmitted by the neighbor sectors, as indicated by block 104. In this example, the mobile station measures a PN offset for a given sector in the plurality of neighbor sectors to obtain a measured PN offset that differs from the nominal PN offset, as indicated by block 106. The mobile station may also measure a signal strength for the given sector, as indicated by block 108. If the signal strength is sufficiently high, e.g., high enough to consider the given sector to be a candidate for handoff, then the mobile station may transmit a measurement message that includes the measured PN offset that the mobile station measured for the given sector and the measured signal strength that the mobile station measured for the given sector, as indicated by block 110. The measurement message could be, for example, a Pilot Strength Measurement Message (PSMM).

In this example, the measured PN offset for the given sector differs from nominal PN offset for the given sector. With reference to the example configuration shown in FIG. 2, this may occur if sector 12b, as the primary sector, transmits a neighbor list that identifies a neighbor sector that is relatively distant from mobile station 18. For example, the neighbor list transmitted by sector 12b may identify sector 14c and sector 16a as neighbor sectors, by identifying their respective nominal PN offsets. In response, mobile station 18 may search for pilot signals from sectors 14c and 16a. For example, to search for a pilot signal from sector 14c, the mobile station 18 may search for a signal that has a phase at mobile station 18 that is within a search window centered about the nominal PN offset of sector 14c.

If mobile station 18 is relatively far away from BTS 14, then the propagation delay may result in the PN offset of the pilot signal for sector 14c being different than the nominal PN offset. For example, if sector 14c has a nominal PN offset of PN 2, then the phase of the pilot signal for sector 14c at mobile station 18 might correspond to a PN offset of PN 3 or PN 4 due to the propagation delay. Nonetheless, mobile station 18 could still find the pilot signal for sector 14c. As one possibility, mobile station 18 may use a search window to find the nominal PN offset of PN 2 that is wide enough to encompass other PN offsets. As another possibility, mobile station 18 may search for PN offsets in addition to the specific PN offsets identified in the neighbor list. In either case, mobile station 18 could find the pilot signal for sector 14c but may identify it by a measured PN offset that is different than the nominal PN offset of sector 14c. Mobile station 18 could also measure the signal strength of the pilot signal for sector 14c and, if the measured signal strength is high enough, report the measured PN offset and measured signal strength of sector 14 by transmitting a PSMM to system 10.

FIG. 4 illustrates how the method may continue after the mobile station transmits the measurement message (block 110 of FIG. 3). The spread spectrum communication system receives the measurement message that includes the measured PN offset and the measured signal strength that the mobile station measured for the given sector, as indicated by block 112.

The spread spectrum communication system determines a location associated with the mobile station, as indicated by block 114. In one example, the spread spectrum communication system determines the location associated with the mobile station based on location coordinates of the mobile station that are included in the measurement message. The location coordinates could be coordinates that the mobile station obtained using satellite-based signals (such as GPS), terrestrial-based signals, a combination of satellite-based and terrestrial-based signals, or by some other method.

Alternatively, the spread spectrum communication system could determine the location associated with the mobile station based on round-trip delay (RTD) measurements. For example, with reference to the configuration shown in FIG. 2, system 10 may determine that sector 12b is the primary sector serving mobile station 18 and may determine a distance between mobile station 18 and BTS 12 based on RTD measurements obtained by BTS 12. A location along the centerline of sector 12b at a distance from BTS 12 that corresponds to the RTD-determined distance may then be taken as the location associated with mobile station 18. Still other ways of determining a location associated with the mobile station could be used.

The spread spectrum communication system then determines the nominal PN offset of the given sector based on the measured PN offset and the location associated with the mobile station, as indicated by block 116. This may involve the spread spectrum communication system determining that a distance between the location associated with the mobile station and a location associated with the nominal PN offset (e.g., the location of a BTS that transmits spread spectrum signals with that nominal PN offset) at least partially accounts for a phase difference between the nominal PN offset and the measured PN offset. For example, following the example described above in which mobile station 18 measures a PN offset for sector 14c that is different than its nominal PN offset, system 10 may determine that the phase difference between the nominal PN offset and the measured PN offset is accounted for (at least approximately) by the propagation delay associated with the distance between BTS 14 and mobile station 18.

The nominal PN offset that the spread spectrum communication system determines in this way identifies the given sector for which the mobile station reported the measured PN offset and the measured signal strength in the measurement message. The spread spectrum communication system may then determine whether the given sector is a valid handoff destination, as indicated by block 118. This, in turn, may involve a determination of whether the measured signal strength that the mobile station reported for the given sector is high enough and whether the given sector is a valid neighboring sector for the mobile station (e.g., whether the given sector was identified as a neighbor sector in the neighbor list transmitted to the mobile station).

In response to a determination that the given sector is a valid handoff destination, the spread spectrum communication system may transmit to the mobile station a handoff instruction that identifies the given sector by the measured PN offset (i.e., the PN offset that the mobile station measured for the given sector), as indicated by block 120. The handoff instruction could be, for example, a Handoff Direction Message (HDM). The handoff instruction may instruct the mobile station to effect a soft handoff to the given sector by receiving a forward traffic channel of the given sector for the call.

The mobile station may receive the handoff instruction and responsively use the given sector for the call, as indicated by block 122. In this way, the mobile station may continue the call using both the primary sector and the given sector. With an additional sector now being used for the call, the call is less likely to be dropped.

It is to be understood that the functions described above for the spread spectrum communication system (i.e., blocks 112-120) could be performed by one or more elements of the spread spectrum communication system. For example, the functions could be performed by a BTS serving the mobile station in combination with a BSC or other element that is configured to control the BTS. Thus, in the example configuration of FIG. 2, with sector 12b as the primary sector serving mobile station 18, the functions of blocks 112-120 could be performed by BTS 12 in combination with BSC 26. For example, BSC 26 could be configured to receive the measurement message through BTS 12 (block 112). BSC 26 could also be configured to determine a location associated with the mobile station (block 114), determine the nominal PN offset of the given sector based on the measured PN offset and the location associated with the mobile station (block 116), and determine whether the given sector is a valid handoff destination (block 118). Further, BSC 26 could be configured, in response to a determination that the given sector is a valid handoff destination, to generate a handoff instruction for transmission by BTS (block 120).

It is to be understood, however, that this distribution of functions between BTS and BSC is exemplary only. The functions described above could be distributed among various elements of the spread spectrum communication system in various ways, which may involve a BSC or other type of control element.

4. Exemplary Mobile Station

Figure 5:
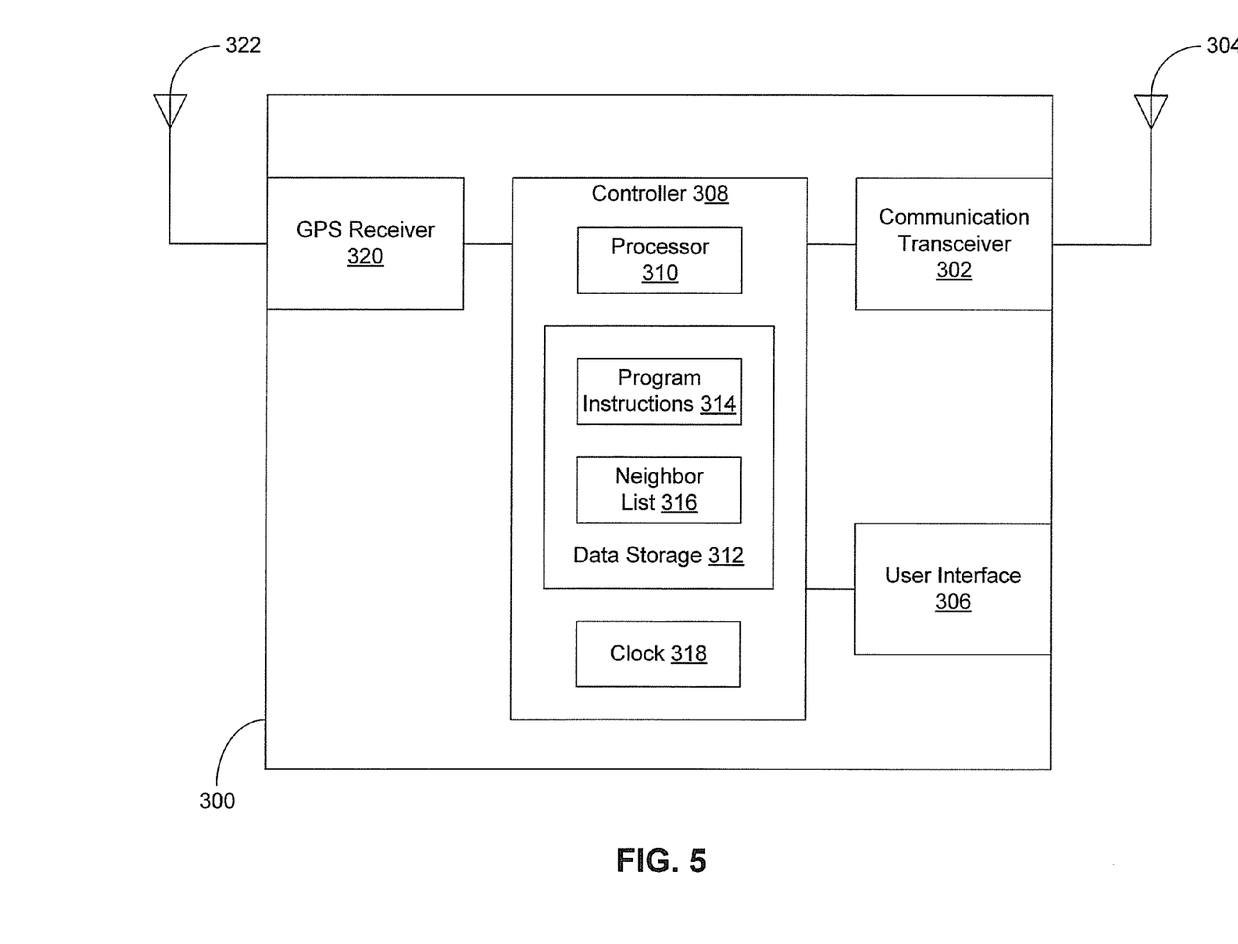
FIG. 5 is a block diagram of a mobile station, in accordance with an exemplary embodiment.

FIG. 5 illustrates an exemplary mobile station 300 that can operate in accordance with the methods described above. Mobile Station 300 includes a communication transceiver 302 for communicating with one or more BTSs in a spread spectrum communication system via an antenna 304. More particularly, communication transceiver 302 may function as a transmitter for transmitting spread spectrum signals to one or more BTSs and may function as a receiver for receiving spread spectrum signals transmitted by one or more BTSs.

Mobile station 300 also includes a user interface 306 for obtaining input from a user of mobile station 300 and for conveying information to user. Thus, user interface 306 may include a keypad, touch screen, or other controls by which the user may provide input into mobile station 300. User interface 306 may also include a display for displaying textual, graphical, or other visual information to the user. Mobile station 300 may also be configured for voice communication. User interface 306 may include a microphone for receiving audio input from the user and a speaker for conveying audio to the user. Alternatively, mobile station 300 may communicate with an external microphone and/or speaker, for example, via a wireless connection.

The functioning of mobile station 300 may be controlled by a controller 308 that is coupled to communication transceiver 302 and to user interface 306. Controller 308 may comprise a processor 310 and data storage 312. Data storage 312 may include any type of non-transitory computer readable media, for example, random access memory (RAM), read only memory (ROM), cache memory, flash memory, one or more magnetically-encoded disks, and/or one or more optically-encoded disks. Data storage 312 may store program instructions 314 that are executable by processor 310 to control the functioning of mobile station 300. Data storage 312 may also store other information, such as a neighbor list 316 transmitted by a primary sector of the spread spectrum communication system.

Program instructions 314 may be executable by processor 310 so as to cause mobile station 300 to perform functions described above, for example, functions described above with reference to FIG. 3 and/or FIG. 4. Thus, in one example, program instructions 314 may be executable by processor 310 to perform the functions of: (a) receiving, through communication transceiver 302, a neighbor list transmitted by a primary sector of the spread spectrum communication system (e.g., a sector being used for a call), wherein the neighbor list identifies a plurality of neighbor sectors by their respective nominal PN offsets; (b) using communication transceiver 302 to measure a PN offset of a spread spectrum signal transmitted by a given sector in the plurality of neighbor sectors to obtained a measured PN offset (the measured PN offset may differ from the nominal PN offset that identified the given sector in the neighbor list); (c) using communication transceiver 302 to measure a signal strength of the spread spectrum signal transmitted by the given sector to obtain a measured signal strength; (d) transmitting, through communication transceiver 302, a measurement message that includes the measured PN offset and the measured signal strength (the measurement message may also include location coordinates of mobile station 300); (e) receive, through communication transceiver 302, a handoff instruction that identifies the given sector by the measured PN offset; and (f) in response to the handoff instruction, use the given sector for the call.

Controller 308 may also include internal clock 318 that mobile station 300 uses to measure PN offsets. For example, every even second according to internal clock 318 may be used as a reference time for determination of PN offsets. Internal clock 318 may be synchronized (or nearly synchronized) to the system time used by the spread spectrum communication system. This synchronized may be achieved by mobile station 300 receiving system time information that is transmitted by the primary sector.

As noted above, mobile station 300 may be configured to include its location coordinates in the measurement messages that it transmits. Mobile station 300 may determine the location coordinates, for example, based on signals received from a satellite-based positioning system. Thus, mobile station 300 may include a GPS receiver 320 for receiving GPS signals via an antenna 322. Mobile station 300 may also include other location-determination systems instead of, or in addition to, GPS receiver 320.

5. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for a spread spectrum communication system, wherein said spread spectrum communication system comprises a plurality of sectors in which each sector is associated with a respective nominal pseudonoise (PN) offset, said method comprising:
    said spread spectrum communication system receiving a measurement message from a mobile station, wherein said measurement message includes a measured PN offset that said mobile station measured for a given sector in said plurality of sectors and further includes a signal strength that said mobile station measured for said given sector, wherein said measured PN offset differs from a nominal PN offset of said given sector;
    said spread spectrum communication system determining a location associated with said mobile station;
    said spread spectrum communication system determining said nominal PN offset of said given sector based on said measured PN offset and said location associated with said mobile station by a process comprising said spread spectrum communication system determining that a distance between said location associated with said mobile station and a location associated with said nominal PN offset at least partially accounts for a phase difference between said nominal PN offset and said measured PN offset;
    said spread spectrum communication system determining whether said given sector is a valid handoff destination based on the difference between the measured PN offset for the given sector and the nominal PN offset and said spread spectrum communication system determining whether said nominal PN offset of said given sector was in a neighbor list transmitted to said mobile station; and
    in response to a determination that said given sector is a valid handoff destination, said spread spectrum communication system transmitting to said mobile station a handoff instruction that identifies said given sector by said measured PN offset.

2. The method of claim 1, wherein said location associated with said nominal PN offset is a location of a base transceiver station (BTS) that transmits spread spectrum signals with said nominal PN offset.

3. The method of claim 1, wherein said spread spectrum communication system determining a location associated with said mobile station comprises said spread spectrum communication system receiving location coordinates from said mobile station.

4. The method of claim 3, wherein said measurement message includes said location coordinates.

5. The method of claim 1, wherein said spread spectrum communication system determining a location associated with said mobile station comprises:
    determining a primary sector serving said mobile station; and
    determining a distance between said mobile station and a primary base transceiver station (BTS) that defines said primary sector.

6. The method of claim 5, wherein determining said distance between said mobile station and said primary BTS comprises measuring a round-trip delay for spread spectrum signals transmitted between said mobile station and said primary BTS.

7. The method of claim 1, wherein said spread spectrum communication system determining whether said given sector is a valid handoff destination comprises said spread spectrum communication system determining whether said nominal PN offset of said given sector was in a neighbor list transmitted to said mobile station.

8. The method of claim 1, wherein said measurement message is a Pilot Strength Measurement Message (PSMM).

9. The method of claim 1, wherein said handoff instruction is a Handoff Direction Message (HDM).

10. A spread spectrum communication system, comprising: a plurality of base transceiver stations (BTSs) that are configured to provide wireless coverage in a plurality of sectors, wherein each sector is associated with a respective nominal pseudonoise (PN) offset;
    a controller for controlling said plurality of BTSs, wherein said controller is configured to:
    (a) receive a measurement message from a mobile station, wherein said measurement message includes a measured PN offset that said mobile station measured for a given sector in said plurality of sectors and further includes a signal strength that said mobile station measured for said given sector, wherein said measured PN offset differs from a nominal PN offset of said given sector; (b) determine a location associated with said mobile station;

(c) determine said nominal PN offset of said given sector based on said measured PN offset and said location associated with said mobile station by a process comprising said controller determining that a distance between said location associated with said mobile station and a location associated with said nominal PN offset at least partially accounts for a phase difference between said nominal PN offset and said measured PN offset;

(d) determine whether said given sector is a valid handoff destination based on the difference between the measured PN offset for the given sector and the nominal PN offset and said spread spectrum communication system determining whether said nominal PN offset of said given sector was in a neighbor list transmitted to said mobile station; and (e) in response to a determination that said given sector is a valid handoff destination, generate a handoff instruction for said mobile station, wherein said handoff instruction identifies said given sector by said measured PN offset.

11. The spread spectrum communication system of claim 10, wherein said controller is configured to determine said location associated with said mobile station based on location coordinates of said mobile station included in said measurement message.

12. The spread spectrum communication system of claim 10, wherein said controller is configured to determine said location associated with said mobile station based on one or more round-trip delay measurements obtained by a BTS serving said mobile station.

13. The spread spectrum communication system of claim 10, wherein said controller comprises a base station controller (BSC).

* * * * *